W. HOPPIE.
CELL.
APPLICATION FILED JUNE 1, 1915.
1,169,258.
Patented Jan. 25, 1916.
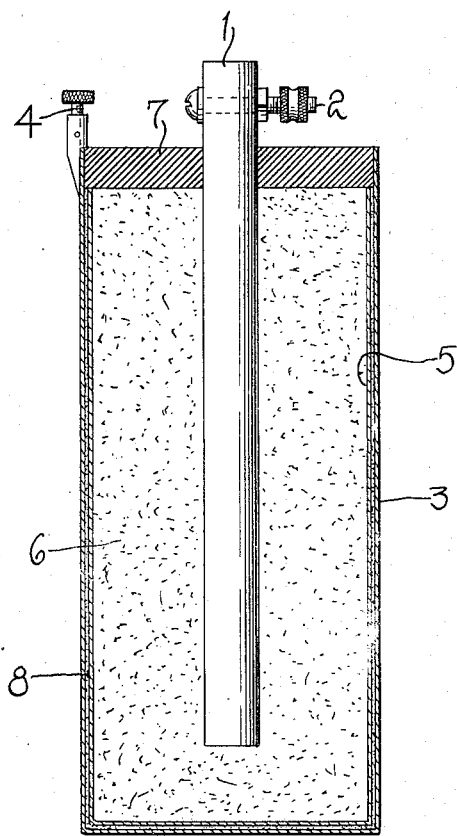
Inventor
W. HOPPIE
By Watson E. Coleman
Attorney

UNITED STATES PATENT OFFICE.

WILLIAM HOPPIE, OF LAWNDALE, CALIFORNIA.

CELL.

1,169,258.  Specification of Letters Patent.  Patented Jan. 25, 1916.

Application filed June 1, 1915. Serial No. 31,550.

*To all whom it may concern:*

Be it known that I, WILLIAM HOPPIE, a citizen of the United States, residing at Lawndale, in the county of Los Angeles and State of California, have invented certain new and useful Improvements in Cells, of which the following is a specification, reference being had to the accompanying drawings.

This invention relates to certain improvements in that type of galvanic cells commonly known as dry cells, and it is an object of my invention to provide a device of this general character having novel and improved means whereby the deterioration of the cell during its "shelf life" or during the period before it is put into active service is prevented, and furthermore to prevent deterioration during long periods of inactivity after being placed in use.

The invention consists in the details of construction and in the combination and arrangement of the several parts of my improved device whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawing, wherein is disclosed a longitudinal sectional view of a cell constructed in accordance with an embodiment of my invention.

As disclosed in the accompanying drawings, 1 is a negative electrode provided with a binding post 2 which constitutes one of the terminals of the battery. The container 3, as herein embodied, is made of zinc and constitutes the positive electrode. To this zinc container the binding post 4 is attached to provide the second terminal of the battery. Within the zinc container 3 is a bibulous or porous lining 5 which serves the well known purpose of preventing the battery mix 6 from which is packed in the lined container from coming in contact with the zinc container and also serves as a reservoir for the electrolyte. The mix may be of any of the well known compositions. The cell is sealed in the usual manner by a covering 7 which prevents any deterioration from the action of the atmosphere and external sources and also makes the cell impervious to water.

After a dry cell has been standing for as short a time as one or two months, tests will show that the short circuit current of the cell has decreased and a general deterioration soon follows. After a certain time the cell may become practically useless from merely standing on the shelves awaiting sale and without any use whatever. This is in part due to the drying out of the electrolyte thereby causing a crystalline deposit to be made on the inside of the metallic electrode which greatly increases the internal resistance and causes the cell to deteriorate, and in part due to local action between the zinc or other metal electrode and the mix, whereby the electrode is eaten away. To prevent this fault during the unavoidable period in which a cell is not in use is the purpose of my invention, and the way in which the result is accomplished is as follows. It has been found advantageous to use dry powdery material such as flour in dry cells of both the wet and dry lining type. In the wet lining type, the flour is incorporated in the lining type, in form of a paste. In the dry lining cell in form of a paste. In the dry lining type, it has been the practice to moisten the inside of the zinc can with water and dust the dry flour in it so that it adheres to the zinc. Zinc will not thoroughly wet with water but acts toward it much in the same way that an oily surface will; *i. e.,* the water instead of spreading evenly over the surface of the zinc collects in small patches. The result of this is that when flour is dusted around the inside of the can, it adheres in small patches instead of being distributed evenly over the zinc. Oils do not act in this way, but will form a uniform coat over the zinc. The use of oil increases the internal resistance of the cell and prevents the proper action of the electrolyte upon the zinc surface so covered. I, therefore, find that a substantially uniform coating 8 of flour or other powdery material may be applied to the inner surface of the zinc container by first coating it with an organic or carbohydrate syrup, such as glucose in solution. The use of an organic or carbohydrate syrup provides a very convenient manner of applying the powdery material uniformly to the zinc container and, in addition, I obtain the advantages of a low internal resistance, a more active surface of the zinc exposed to the electrolyte by such lower resistance, and a noncrystallizable coating on the zinc surface that is more absorbable of the electrolyte.

My invention is not limited to dry cells of the dry lining type, as it will be self-evident that my invention can be employed with equal facility in connection with a cell of the wet lining type. Furthermore, it is not believed necessary to specifically set forth the manner whereby the organic or carbohydrate syrup is applied to the zinc surface in the case of a dry lining or a wet lining.

From the foregoing description, it is thought to be obvious that a cell constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. In a dry cell, coating for one of the electrodes consisting of a mixture of an organic syrup and a powdery material.

2. In a dry cell, coating for one of the electrodes consisting of a mixture of a carbohydrate syrup and a powdery material.

3. In a dry cell, coating for one of the electrodes consisting of a mixture of glucose and a powdery material.

4. The process of coating a dry cell part which consists in applying a layer of an organic syrup thereto and then adding a dry powder to such applied layer.

In testimony whereof I hereunto affix my signature in the presence of two witnesses.

WILLIAM HOPPIE.

Witnesses:
LILLIAN MOSELEY,
MARION W. BESSOM.